(12) United States Patent
Matsuoka et al.

(10) Patent No.: US 8,932,784 B2
(45) Date of Patent: Jan. 13, 2015

(54) FUEL CELL

(75) Inventors: Kouji Matsuoka, Gunma (JP); Shigeru Sakamoto, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 1315 days.

(21) Appl. No.: 12/078,194

(22) Filed: Mar. 27, 2008

(65) Prior Publication Data

US 2009/0191439 A1 Jul. 30, 2009

(30) Foreign Application Priority Data

Mar. 27, 2007 (JP) .................................. 2007-082664
Jan. 30, 2008 (JP) .................................. 2008-018878

(51) Int. Cl.
| | |
|---|---|
| H01M 8/10 | (2006.01) |
| H01M 8/12 | (2006.01) |
| H01M 4/86 | (2006.01) |
| H01M 4/90 | (2006.01) |
| H01M 4/92 | (2006.01) |

(52) U.S. Cl.
CPC .......... *H01M 8/1004* (2013.01); *H01M 8/1226* (2013.01); *H01M 8/1206* (2013.01); *H01M 8/1002* (2013.01); *H01M 4/8605* (2013.01); *H01M 4/8642* (2013.01); *H01M 4/90* (2013.01); *H01M 4/926* (2013.01); *H01M 2008/1095* (2013.01); *Y02E 60/521* (2013.01)
USPC .......... 429/523; 429/456; 429/457; 429/483; 429/484; 429/514; 429/534

(58) Field of Classification Search
None
See application file for complete search history.

(56) References Cited

U.S. PATENT DOCUMENTS 5,866,423 A * 2/1999 Sugawara et al. .................. 436/5
6,812,187 B1 11/2004 Pak et al.
2001/0018144 A1* 8/2001 Watakabe et al. ............... 429/33

(Continued)

FOREIGN PATENT DOCUMENTS

CN 1521877 8/2004
JP 2002-203569 7/2002

(Continued)

OTHER PUBLICATIONS

Kompan, M.E.; Sapurina, I. Yu.; and Stejskal, J., Overcoming the Low-Dimension Crisis in the Active Zone of Fuel Cells, Technical Physics Letters, 2006, vol. 32, No. 3, pp. 213-216.*

(Continued)

*Primary Examiner* — Ula C. Ruddock
*Assistant Examiner* — Scott J Chmielecki
(74) *Attorney, Agent, or Firm* — McDermott Will & Emery LLP

(57) ABSTRACT

A fuel cell includes a plate-like cell, a separator on one side of the plate-like cell, and a separator on the other side of the plate-like cell. The plate-like cell includes a solid polymer electrolyte membrane, an anode, and a cathode. The anode has a stacked body composed of a catalyst layer and a gas diffusion layer. The cathode has a stacked body composed of a catalyst layer and a gas diffusion layer. The catalyst layer contains a porous carbon material formed with micro pores, which functions as an electric double layer, and an ion-exchange resin. At least part of the porous carbon material supports a catalytic metal such as platinum. The porous carbon material to be used is preferably a carbide-derived carbon. The carbide-derived carbon preferably has micro pores of 1 nm or less.

10 Claims, 4 Drawing Sheets

(56) References Cited

U.S. PATENT DOCUMENTS

| | | | |
|---|---|---|---|
| 2003/0170509 A1* | 9/2003 | Datz et al. | 429/13 |
| 2005/0220988 A1* | 10/2005 | Dodelet et al. | 427/113 |
| 2007/0015061 A1* | 1/2007 | Klaassen | 429/322 |
| 2007/0178232 A1* | 8/2007 | Kodas et al. | 427/180 |
| 2007/0224479 A1* | 9/2007 | Tadokoro et al. | 429/30 |

FOREIGN PATENT DOCUMENTS

| | | | |
|---|---|---|---|
| JP | WO/2005/104275 | * | 11/2005 |
| JP | 2005-332807 A | | 12/2005 |
| WO | WO 9944245 A1 | * | 9/1999 |
| WO | WO 2005104275 A1 | * | 11/2005 |
| WO | 2006/130706 A1 | | 12/2006 |

OTHER PUBLICATIONS

Chmiola, John; Yushin, G.; Gogotsi, Y.; Portet, Christele; Simon, Patrice; and Taberna, Pierre-Louis, Anomalous Increase in Carbon Capacitance at Pore Sizes Less Than 1 Nanometer, Science Magazine, vol. 313 (2006). pp. 1760-1763.*

Leis, J.; Arulepp, M.; Kuura, A.; Latt, M.; Lust, E., Electrical double-layer characteristics of novel carbide-derived carbon materials, Carbon 44 (2006), pp. 2122-2129.*

Chinese Office Action, with English translation, issued in Chinese Patent Application No. 200810087616.1, mailed Jul. 10, 2009.

Dash, R., et al., "Titanium carbide derived nanoporous carbon for energy-related applications", Carbon, 2006, pp. 2489-2497, vol. 44, Elsevier.

Office Action issued in Japanese Application No. 2008-018878 dated Feb. 5, 2013.

* cited by examiner

FUEL CELL

CROSS-REFERENCE TO RELATED APPLICATIONS

This application is based upon and claims the benefit of priority from the prior Japanese Patent Application No. 2007-082664, filed Mar. 27, 2007, and Japanese Patent Application No. 2008-018878, filed Jan. 30, 2008, the entire contents of which are incorporated herein by reference.

BACKGROUND OF THE INVENTION

1. Field of the Invention

The present invention relates to a fuel cell for generating electric power by an electrochemical reaction between hydrogen and oxygen.

2. Description of the Related Art

Recently much attention has been focused on fuel cells that feature not only high energy conversion efficiency but also no hazardous substance produced by the electricity-generating reaction. Known as one of such fuel cells is the polymer electrolyte fuel cell which operates at temperatures below 100° C.

A polymer electrolyte fuel cell, which has a basic structure of a solid polymer electrolyte membrane disposed between a fuel electrode and an air electrode, generates power through an electrochemical reaction as described below by supplying a fuel gas containing hydrogen to the fuel electrode and an oxidant gas containing oxygen to the air electrode.

$$\text{Fuel electrode: } H_2 \rightarrow 2H^+ + 2e^- \quad (1)$$

$$\text{Air electrode: } (½)O_2 + 2H^+ + 2e^- \rightarrow H_2O \quad (2)$$

An anode and a cathode have each a stacked structure of a catalyst layer and a gas diffusion layer. And a fuel cell is composed of catalyst layers of the respective electrodes disposed counter to each other in such a manner as to support a solid polymer membrane therebetween. The catalyst layer is a layer of a catalyst or carbon particles supporting a catalyst bound together by an ion-exchange resin. The gas diffusion layer serves as a passage for the oxidant gas or the fuel gas.

At the anode, the hydrogen contained in the supplied fuel is decomposed into hydrogen ions and electrons as expressed in the above formula (1). Of them, the hydrogen ions travel inside the solid polymer electrolyte membrane toward the air electrode, whereas the electrons travel through an external circuit to the air electrode. At the cathode, on the other hand, the oxygen contained in the oxidant gas supplied thereto reacts with the hydrogen ions and electrons having come from the fuel electrode to produce water as expressed in the above formula (2). In this manner, the electrons travel from the fuel electrode toward the air electrode in the external circuit, so that the electric power is extracted therefrom.

When the fuel cell is stopped with a cessation of the supply of the fuel gas to the anode, air begins to mix into the gas on an anode side. If the fuel cell is started again in this state, protons will be conducted from the anode to the cathode through the electrolyte membrane on an upstream side where the density of the fuel gas is high. On a downstream side, however, where the density of the fuel gas is low due to the mixing of air, a reaction as expressed in the formula below progresses at the cathode, and a reverse current flows with protons conducted from the cathode to the anode.

More specifically, as illustrated in FIG. 1, on the upstream side of the reaction gas, reactions as expressed in formulas (3) and (4) below take place the same way as in ordinary cell reaction at an anode 2 and a cathode 4, respectively, which supports an electrolyte membrane 6 in between. On an exit side (downstream side), on the other hand, reactions as expressed in formulas (5) and (6) below take place at the anode 2 and the cathode 4, respectively, and a reverse current is produced. As a result of the reaction of formula (6) at the cathode 4 on the exit side, oxidation and corrosion of carbon particles supporting a catalyst and an ion-exchange resin, both used in the cathode 4, progress thereby deteriorating the electronic performance and shortening the life of the fuel cell.

Upstream side:

$$\text{Anode: } H_2 \rightarrow 2H^+ + 2e^- \quad (3)$$

$$\text{Cathode: } O_2 + 4H^+ + 4e^- \rightarrow 2H_2O \quad (4)$$

Downstream side:

$$\text{Anode: } O_2 + 4H^+ + 4e^- \rightarrow 2H_2O \quad (5)$$

$$\text{Cathode: } C + 2H_2O \rightarrow CO_2 + 4H^+ + 4e^- \quad (6)$$

SUMMARY OF THE INVENTION

The present invention has been made in view of the foregoing problems, and a general purpose thereof is to provide a technology for restricting the reverse current that occurs at the starting of a fuel cell.

One embodiment of the present invention relates to a fuel cell. The fuel cell includes: an electrolyte membrane; an anode disposed on one side of the electrolyte membrane; and a cathode disposed on the other side of the electrolyte membrane, wherein the cathode contains a porous carbon material formed with micro pores which function as an electric double layer.

Thus, as illustrated in FIG. 2, on the upstream side of the reaction gas, reactions as expressed in formulas (7) and (8) below take place the same way as in ordinary cell reaction at an anode 2 and a cathode 4, respectively, which support an electrolyte membrane 6 in between. On the downstream side, on the other hand, a reaction as expressed in formula (9) below goes on at the anode 2, but an electrical charging of the electric double layer occurs in a porous carbon material 8 on a cathode 4 side. Consequently, the aforementioned reaction of formula (6) is obstructed, thereby suppressing the oxidation, corrosion and the like of the carbon particles supporting a catalyst and the ion-exchange resin.

Upstream side:

$$\text{Anode: } H_2 \rightarrow 4H^+ + 2e^- \quad (7)$$

$$\text{Cathode: } O_2 + 4H^+ + 4e^- \rightarrow 2H_2O \quad (8)$$

Downstream side:

$$\text{Anode: } O_2 + 4H^+ + 4e^- \rightarrow 2H_2O \quad (9)$$

$$\text{Cathode: Charging of electric double layer} \quad (10)$$

In the above-described embodiment, the porous carbon material may be derived from a carbide. And the carbide may be selected from a group consisting of titanium carbide, molybdenum carbide, and tungsten carbide. Also, the capacity of the electric double layer of the porous carbon material may be 110 F/g or more. Also, the capacity of the electric double layer of the porous carbon material may be 50 mF/cm² or more in comparison with an electrode area. Perfluoroorganic acid may be mixed with the porous carbon material. A proton-electron mixed conductor may be mixed with the porous carbon material. Further, the porous carbon material may support any of catalytic metal, catalytic metal oxide and catalytic carbide therewithin. Furthermore, a content of the porous carbon material in the cathode on a downstream side of the reaction gas may be larger than that of the porous carbon material in the cathode on an upstream side thereof.

In any of the above-described embodiments, the reverse current occurring at the starting of the fuel cell is used to charge the electric double layer, so that the oxidation of the carbon is suppressed.

It is to be noted that any arbitrary combinations or rearrangement, as appropriate, of the aforementioned constituting elements and so forth are all effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

The embodiments will now be described with reference to drawings.

(First Embodiment)

Figure 1:
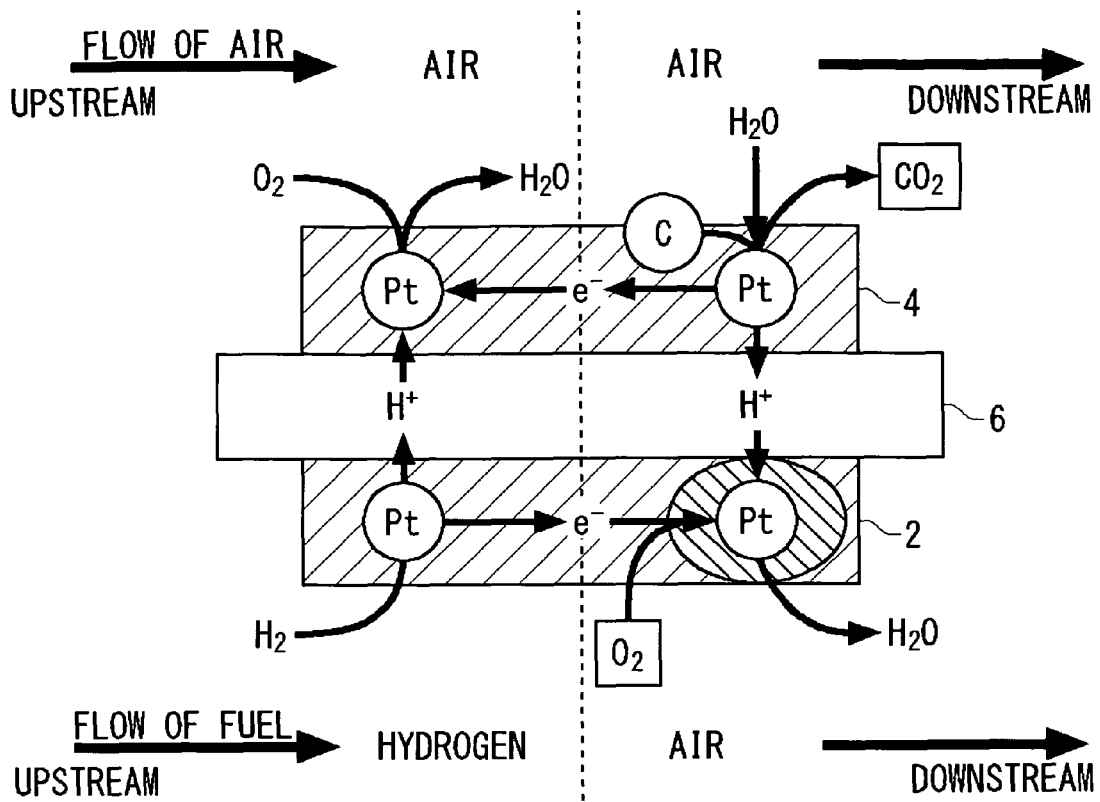
FIG. 1 illustrates a mechanism of reverse current that occurs at the starting of a fuel cell.
Figure 2:
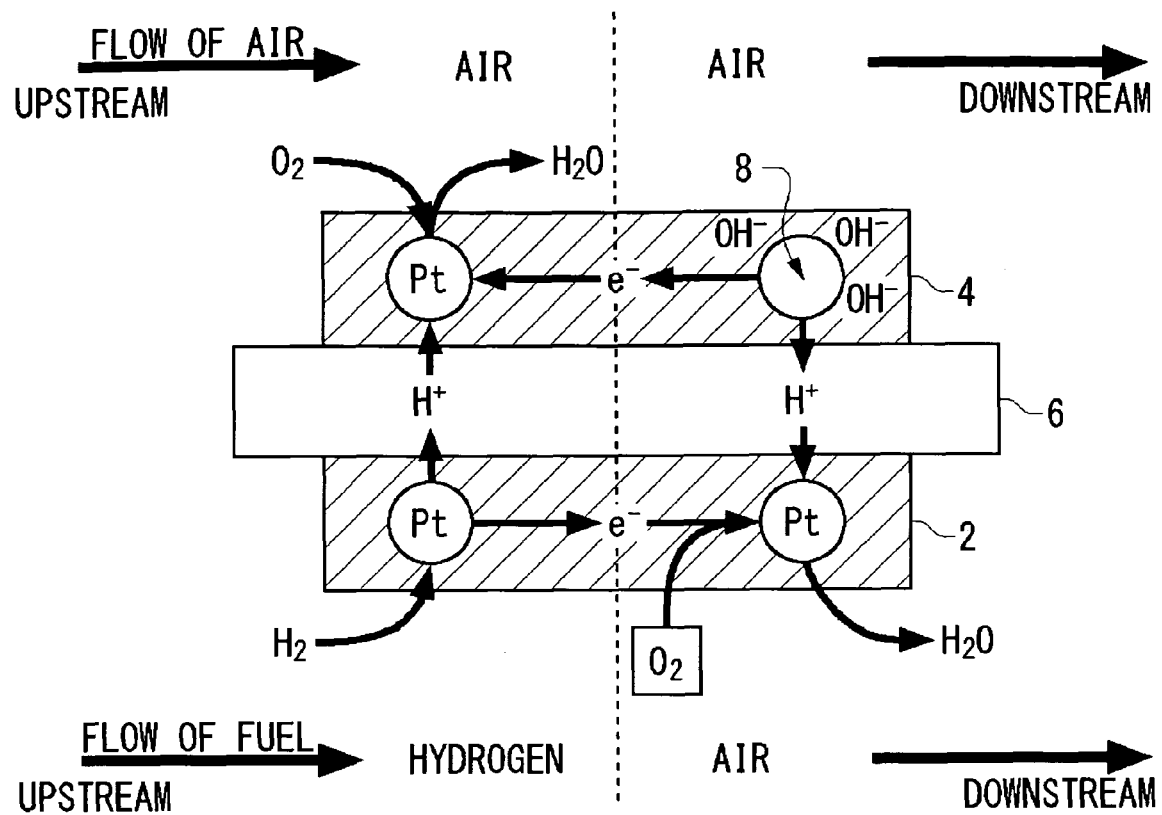
FIG. 2 illustrates a mechanism which suppresses reverse current occurring at the starting of a fuel cell.
Figure 3:
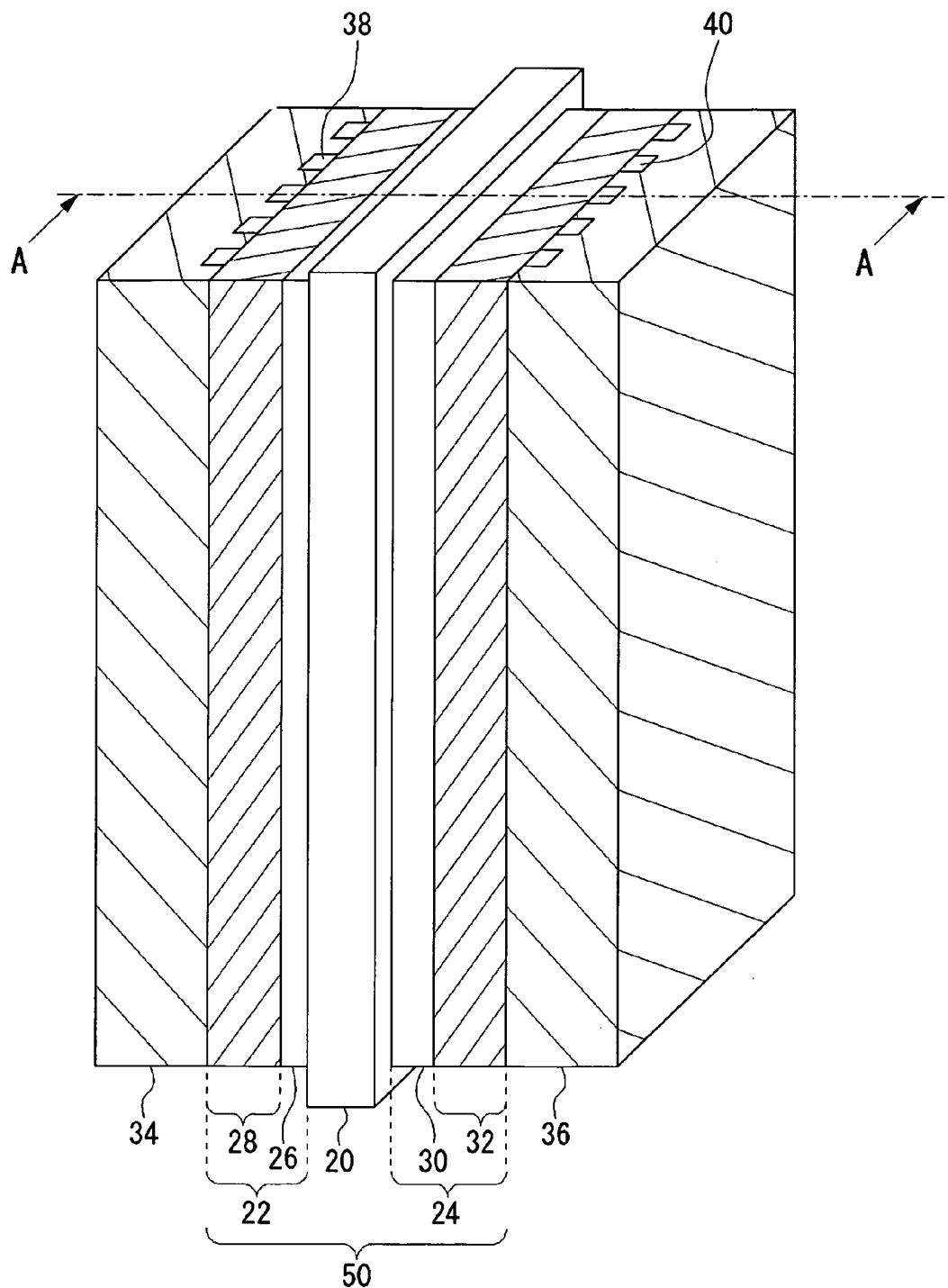
FIG. 3 is a perspective view schematically illustrating a structure of a fuel cell according to a first embodiment of the present invention.
Figure 4:
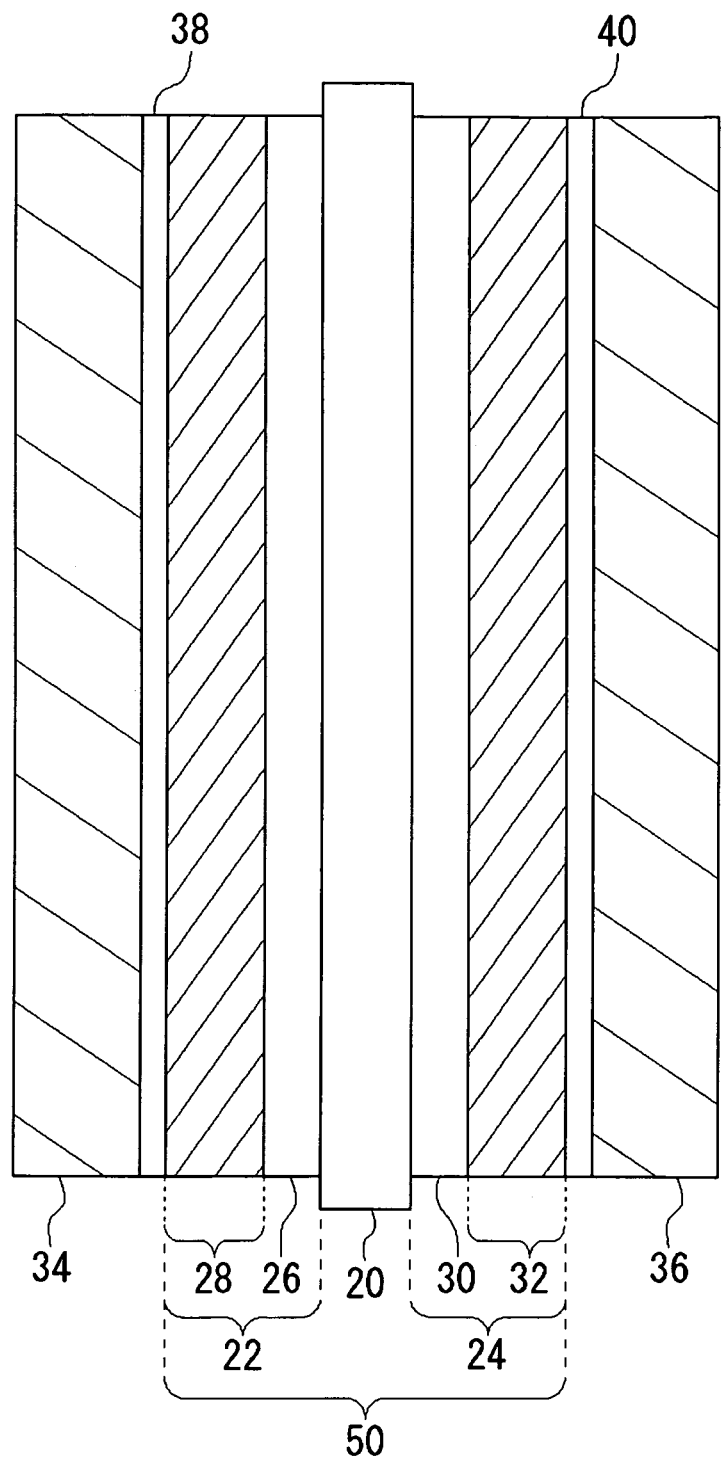
FIG. 4 is a cross-sectional view taken on line A-A of FIG. 3.

FIG. 3 is a perspective view schematically illustrating a structure of a fuel cell 10 according to a first embodiment of the present invention. FIG. 4 is a cross-sectional view taken on line A-A of FIG. 3. The fuel cell 10 is comprised of a plate-like cell 50, a separator 34 on one side of thee plate-like cell 50, and a separator 36 on the other side thereof. Although only one cell 50 is shown in this example, the fuel cell 10 may be composed of a plurality of cells 50 with separator 34 or separator 36 disposed in between as appropriate. The cell 50 includes a solid polymer electrolyte membrane 20, an anode 22, and a cathode 24. The anode 22 has a stacked body comprised of a catalyst layer 26 and a gas diffusion layer 28. Similarly, the cathode 24 has a stacked body comprised of a catalyst layer 30 and a gas diffusion layer 32. The catalyst layer 26 of the anode 22 and the catalyst layer 30 of the cathode 24 are disposed counter to each other with the solid polymer electrolyte membrane 20 held therebetween.

The separator 34 on the anode 22 side is provided with gas channels 38. From a manifold (not shown) for supplying fuel, the fuel gas is distributed to the gas channels 38 and supplied to the cell 50 through the gas channels 38. Similarly, the separator 36 on the cathode 24 side is provided with gas channels 40. From a manifold (not shown) for supplying an oxidant, the oxidant gas is distributed to the gas channels 40 and supplied to the cell 50 through the gas channels 40. More specifically, when the fuel cell 10 is operating, the fuel gas, such as hydrogen gas, is supplied to the anode 22 as the fuel gas flows downward through the gas channels 38 along the surface of the gas diffusion layer 28. At the same time, when the fuel cell 10 is operating, the oxidant gas, such as air, is supplied to the cathode 24 as the oxidant gas flows downward through the gas channels 40 along the surface of the gas diffusion layer 32. In this arrangement, a reaction occurs within the cell 50. That is, as the hydrogen gas is supplied to the catalyst layer 29 through the gas diffusion layer 28, the hydrogen in the gas is turned into protons, and the protons travel through the solid polymer electrolyte membrane 20 to the cathode 24 side. Electrons released at this time move to an external circuit and then flow into the cathode 24 from the external circuit. On the other hand, as air is supplied to the catalyst layer 30 through the gas diffusion layer 32, the oxygen combines with the protons, thus turning into water. In the external circuit, therefore, electrons flow from the anode 22 to the cathode 24, which produces electric power.

The solid polymer electrolyte membrane 20, which displays an excellent ion conductivity in a damp condition, functions as an ion-exchange membrane that allows transfer of protons between the anode 22 and the cathode 24. The solid polymer electrolyte membrane 20 may be formed of a solid polymer material of fluorine-containing polymer or nonfluorine polymer, which may be, for example, a sulfonic acid type perfluorocarbon polymer, a polysulfone resin, or a perfluorocarbon polymer having a phosphonic acid group or carboxylic acid group. One example of a sulfonic acid type perfluorocarbon polymer is Nafion (a registered trademark of DuPont) 112. Also, examples of nonfluorine polymer may be a sulfonated aromatic polyether ether ketone or polysulfone.

The catalyst layer 26 constituting a part of the anode 22 is comprised of an ion-exchange resin and carbon particles supporting a catalyst. The ion-exchange resin plays a role of connecting the carbon particles supporting a catalyst with the solid polymer electrolyte membrane 20 to allow the transfer of protons between the two. The ion-exchange resin may be formed of a polymer material similar to that of the solid polymer electrolyte membrane 20. The catalyst to be supported by the carbon particles may be, for example, platinum, ruthenium, rhodium, palladium, iridium, gold or the like, an alloy of one or two of these metals, or catalytic metal oxide, catalytic metal carbide or the like. Also, the carbon particles supporting such a catalyst may be acetylene black, ketjen black, carbon nanotube, carbon nano-onion, or the like.

The gas diffusion layer 28 constituting another part of the anode 22 includes an anode gas diffusion substrate and a microporous layer applied to the anode gas diffusion substrate. Preferably, the anode gas diffusion substrate is made of a porous material having an electron conductivity, which may, for instance, be a carbon paper or woven or nonwoven cloth of carbon.

The microporous layer applied to the anode gas diffusion substrate is a pasty material derived by kneading an electrically conductive powder and a water repellent agent together. The electrically conductive powder may be carbon black, for instance. The water repellent agent that can be used may be a fluorine resin such as polytetrafluoroethylene (PTFE). Note that the water repellent agent preferably has a cohesive property. The cohesive property meant here is a property that can create a condition of cohesive bond of less viscous and easily crumbling materials together. With the cohesiveness of the water repellent agent, the electrically conductive powder and the water repellent agent can be kneaded together into a paste.

The gas diffusion layer 32 constituting another part of the cathode 24 includes a cathode gas diffusion substrate and a microporous layer applied to the cathode gas diffusion substrate. Preferably, the cathode gas diffusion substrate is made of a porous material having an electron conductivity, which may, for instance, be a carbon paper or woven or nonwoven cloth of carbon.

The microporous layer applied to the cathode gas diffusion substrate is a pasty material derived by kneading an electrically conductive powder and a water repellent agent together. The electrically conductive powder may be carbon black, for instance. The water repellent agent that can be used may be a fluorinated resin such as polytetrafluoroethylene. Note that the water repellent agent preferably has a cohesive property. With the cohesiveness of the water repellent agent, the electrically conductive powder and the water repellent agent can be kneaded together into a paste.

The catalyst layer 30 constituting a part of the cathode 24 contains a porous carbon material formed with micro pores, which functions as an electric double layer, and an ion-exchange resin. The porous carbon material to be used is preferably a carbide-derived carbon. The carbide-derived carbon preferably has micro pores of 1 nm or less. Since the electric double layer is formed in these micro pores, the carbide-derived carbon displays an electric double layer capacity far greater than ketjen black or activated carbon. The electric double layer capacity of the carbide-derived carbon is preferably 110 F/g or more; it is more preferably 125 F/g or more; and it is most preferably 140 F/g or more. The electric double layer capacity of the carbide-derived carbon is preferably 10 $mF/cm^2$ or more; and it is more preferable 50 $mF/cm^2$ or more, in comparison with the cathode electrode area. With the electric double layer capacity being 50 $mF/cm^2$ or more, the amount of charge in the electric double layer of the carbide-derived carbon is enough to suppress the oxidation of the carbon.

The carbide selectable as material for the porous carbon material may be titanium carbide, molybdenum carbide, tungsten carbide, or the like. The process for making the porous carbon material from the carbide will be described later.

In the first embodiment, at least part of the porous carbon material supports a catalytic metal. The catalytic metal may be a metal, such as platinum, palladium, iridium or ruthenium, or an alloy of these metals. It is to be noted that the catalytic metal here can exist as and oxide. In such a case, the porous carbon material functions not only as an electric double layer but also as a catalyst support. This can render the porous carbon material multi-functional and thus eliminate the need to prepare a catalyst support separately.

The ion-exchange resin plays a role of connecting the carbon particles supporting the catalyst with the solid polymer electrolyte membrane 20 to allow the transfer of protons between the two. The ion-exchange resin may be formed of a polymer material similar to that of the solid polymer electrolyte membrane 20.

With a fuel cell implementing the structure as described above, when the fuel cell is started, an electric charging occurs in the electric double layer formed in the micro pores of the carbide-derived porous carbon material contained in the cathode 24, with the result that the oxidation or corrosion of the carbon material in the cathode 24 is suppressed. It should be noted that the content of the carbide-derived porous carbon material in the cathode 24 on a downstream side of the reaction gas is preferably greater than that on an upstream side. If such an arrangement is used, then the occurrence of reverse current following the start of the fuel cell can be effectively suppressed on the downstream side of the reaction gas where air is more likely to remain on the anode 22. To put it concretely, it is desirable that the content (wt %) of the carbide-derived porous carbon material contained in the downstream half of the cathode 24 be greater than the content (wt %) of the carbide-derived porous carbon material contained in the upstream half of the cathode 24.

(Method for Manufacturing a Porous Carbon Material)

A carbide-derived carbon (CDC) to be used as the porous carbon material herein can be manufactured by a high-temperature chlorination of carbide. More specifically, the high-temperature chlorination of carbide can produce a nano-porosity carbon with a hole volume of 50 to 80% by removing metals and half metals as chlorides. Porosity control of the carbide-derived carbon on an atomic level can be accomplished by a control of layer-by-layer metallic extraction which is enabled by using the lattice of carbide as a casting mold and optimizing the parameters for the chlorination. The carbide-derived carbon, with its narrow distribution of pore sizes, is adjustable with an accuracy better than 0.05 nm within a range of about 0.5 nm to about 3 nm. Note that a process of making the carbide-derived carbons may be incorporated into this patent specification by referring to Science, 313, 1760 (2006).

(Method for Manufacturing a Catalyst Layer)

Firstly, a carbon derived from a titanium carbide whose pore size is 0.6 nm to 2.25 nm and whose electric double layer capacity is 125 F/g is manufactured by following the above-described method for manufacturing the porous carbon material. Then a 50 ml of 50% ethanol aqueous solution is added to 5 g of titanium-carbide-derived carbon, and an ultrasonic dispersion is performed. Then, 82 g of 10 wt % dinitrodiamine platinum/nitric acid solution are added to the ethanol aqueous solution containing the titanium-carbide-derived carbon, and an ultrasonic dispersion is performed for one hour. Subsequently, the mixture thus obtained is placed in a constant-temperature bath and left standing at 80° C. for 24 hours to remove the solvent. Now the obtained powder (a mixture of titanium-carbide-derived carbon and dinitrodiamine platinum) is placed in an atmosphere of 10% hydrogen and 90% argon and left standing at 200° C. for 4 hours, thereby making the titanium-carbide-derived carbon support the platinum. Then 3 parts by weight of Nafion (a registered trademark of DuPont) are mixed into 7 parts by weight of the obtained platinum-supporting carbon (carbon derived from titanium carbide) to produce a catalyst slurry. The catalyst slurry thus obtained may be directly applied to the cathode side of the electrolyte membrane or to the gas diffusion layer constituting a part of the cathode by screen printing or spraying.

(Second Embodiment)

A fuel cell according to a second embodiment of the present invention has the same structure as that of the first embodiment as shown in FIG. 3 and FIG. 4 with the exception of a catalyst layer 30 constituting a part of a cathode 24. Hence, a description of components identical to those of the first embodiment will be omitted, and only the catalyst layer 30 constituting a part of the cathode 24 as provided by the second embodiment will be described below.

The catalyst layer 30 constituting a part of the cathode 24 in the second embodiment includes a carbon supporting a catalytic metal, a porous carbon material derived from carbide, and an ion-exchange resin.

The catalytic metal to be supported by the carbon may be, for example, platinum, ruthenium, rhodium, palladium, cobalt, nickel, copper or the like, or an alloy of one or two of these metals. Also, catalytic metal oxide or catalytic metal carbide may be used. The carbon particles supporting a catalyst may be acetylene black, ketjen black, carbon nanotube, carbon nano-onion, or the like.

The porous carbon material derived from carbide and the ion-exchange resin may be of the same materials as in the first embodiment. Perfluoro-organic acid which is lower in molecular weight than perfluorocarbon polymer is mixed with the porous carbon material derived from carbide, thus increasing the capacity of the electric double layer in micro pores. More specifically, $CF_3CH_2OH$, $CF_3(CF_2)CH_2OH$, $CF_3CF_2CH_2OH$, $CF_3CF_2OH$ or the like may be used. Mixing a material having a proton-electron mixed conductor therewith can also increase the capacity of the electric double layer. More specifically, layered ruthenium oxide, perovskite-type oxide, a nanosheet derived from these, or the like may be used.

According to the arrangement as described above, the use of conventional carbon particles as particles supporting the catalyst can suppress the cost required and at the same time can suppress the oxidation or corrosion of the carbon material due to the reverse current that occurs at the starting of the fuel cell because of the porous carbon material derived from carbide.

(Method for Manufacturing a Catalyst Layer)

Platinum-supporting carbon (carbon:ketjen black, platinum: 1:1 weight ratio to carbon), titanium-carbide-derived carbon produced by the aforementioned procedure, and Nafion used as the ion-exchange resin are mixed at a weight ratio of 6:1:3, and a cathode catalyst layer is formed by screen printing.

(Third Embodiment)

A fuel cell according to a third embodiment of the present invention has the same structure as that of the first embodiment as shown in FIG. 3 and FIG. 4 with the exception of a catalyst layer 30 constituting a part of a cathode 24. Hence, a description of components identical to those of the first embodiment will be omitted, and only the catalyst layer 30 constituting a part of the cathode 24 as provided by the third embodiment will be described below.

The catalyst layer 30 constituting a part of the cathode 24 in this third embodiment includes a carbon supporting a catalytic metal, a porous carbon material, derived from carbide, supporting a catalytic metal, and an ion-exchange resin.

The carbon supporting the catalytic metal may be of the same material as in the second embodiment. The porous carbon material, derived from carbide, supporting the catalytic metal and the ion-exchange resin may be of the same materials as in the first embodiment.

According to the arrangement as described above, the use of conventional carbon particles as particles supporting the catalyst can suppress the cost required and at the same time can provide not only the function of suppressing the oxidation or corrosion of the carbon material due to the reverse current that occurs at the starting of the fuel cell because of the porous carbon material derived from carbide but also the function as a catalyst support.

(Fourth Embodiment)

A fuel cell according to a fourth embodiment of the present invention has the same structure as that of the first embodiment as shown in FIG. 3 and FIG. 4 with the exception of a catalyst layer 30 constituting a part of a cathode 24. Hence, a description of components identical to those of the first embodiment will be omitted, and only the catalyst layer 30 constituting a part of the cathode 24 as provided by the fourth embodiment will be described below.

The catalyst layer 30 constituting a part of the cathode 24 in this fourth embodiment includes a catalytic metal, such as platinum black, which does not require a catalyst support, a porous carbon material derived from carbide, and an ion-exchange resin. The porous carbon material derived from carbide and the ion-exchange resin may be of the same materials as in the first embodiment.

According to the arrangement as described above, the use of a catalytic metal requiring no catalyst support can suppress the oxidation or corrosion of the ion-exchange resin due to the reverse current that occurs at the starting of the fuel cell because of the porous carbon material derived from carbon.

The present invention is not limited to the above-described embodiments only, and it is understood by those skilled in the art that various modifications such as changes in design may be made based on their knowledge and the embodiments added with such modifications are also within the scope of the present invention.

What is claimed is:

1. A fuel cell, including:
an electrolyte membrane;
an anode disposed on one side of said electrolyte membrane; and
a cathode disposed on the other side of said electrolyte membrane, wherein
said cathode contains a porous carbon material formed with micro pores which function as an electric double layer and derived from a carbide, a reaction gas flowing along the surface of the cathode,
perfluoro-organic acid is mixed with the porous carbon material, and
a content of the porous carbon material in said cathode on a downstream side of a flow of the reaction gas along the surface of the cathode is larger than that of the porous carbon material in said cathode on an upstream side thereof, and
the carbide is selected from a group consisting of molybdenum carbide and tungsten carbide.

2. The fuel cell according to claim 1, wherein the capacity of the electric double layer of the porous carbon material is 110 F/g or more.

3. The fuel cell according to claim 1, wherein the capacity of the electric double layer of the porous carbon material is 50 mF/cm$^2$ or more in comparison with an electrode area.

4. The fuel cell according to claim 1, wherein a proton-electron mixed conductor is mixed with the porous carbon material.

5. The fuel cell according to claim 1, wherein the porous carbon material supports a material selected from a group consisting of catalytic metal, catalytic metal oxide, and catalytic metal carbide.

6. The fuel cell according to claim 2, wherein the porous carbon material supports a material selected from a group consisting of catalytic metal, catalytic metal oxide, and catalytic metal carbide.

7. The fuel cell according to claim 3, wherein the porous carbon material supports a material selected from a group consisting of catalytic metal, catalytic metal oxide, and catalytic metal carbide.

8. The fuel cell according to claim 1, wherein the cathode includes carbon particles for supporting a catalytic material.

9. The fuel cell according to claim 8, wherein the carbon particles are selected from the group consisting of acetylene black, ketjen black, carbon nanotube, and carbon nano-onion.

10. The fuel cell according to claim 1, wherein a perfluoro-organic acid which is lower in molecular weight than perfluorocarbon polymer is mixed with the porous carbon material.

* * * * *